June 25, 1940.  R. C. BURNLEY  2,205,970
ANIMAL TRAP
Filed Feb. 11, 1939   4 Sheets-Sheet 1
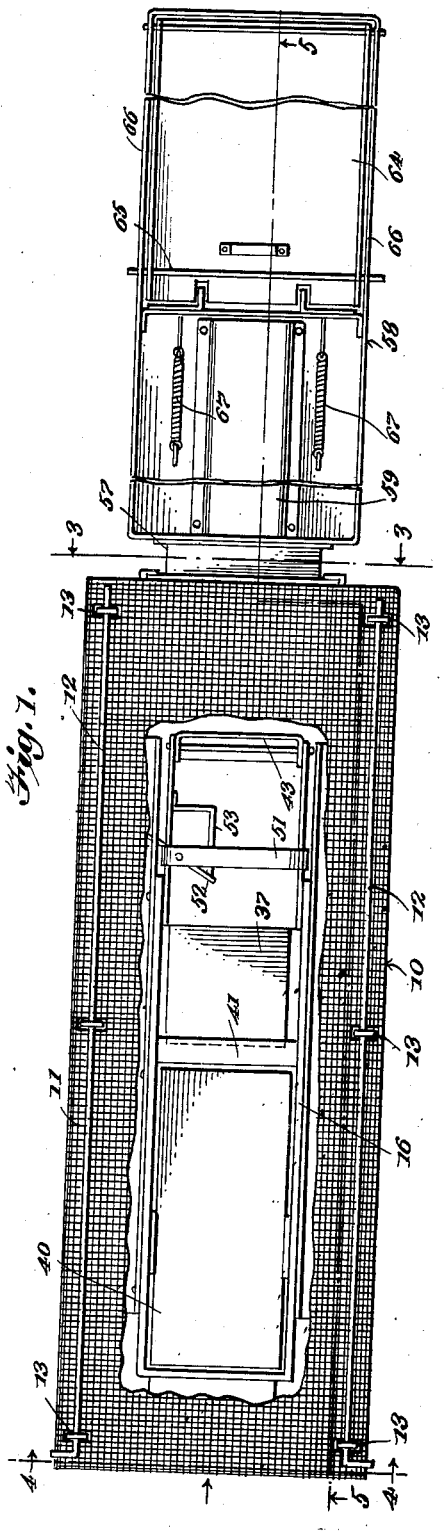
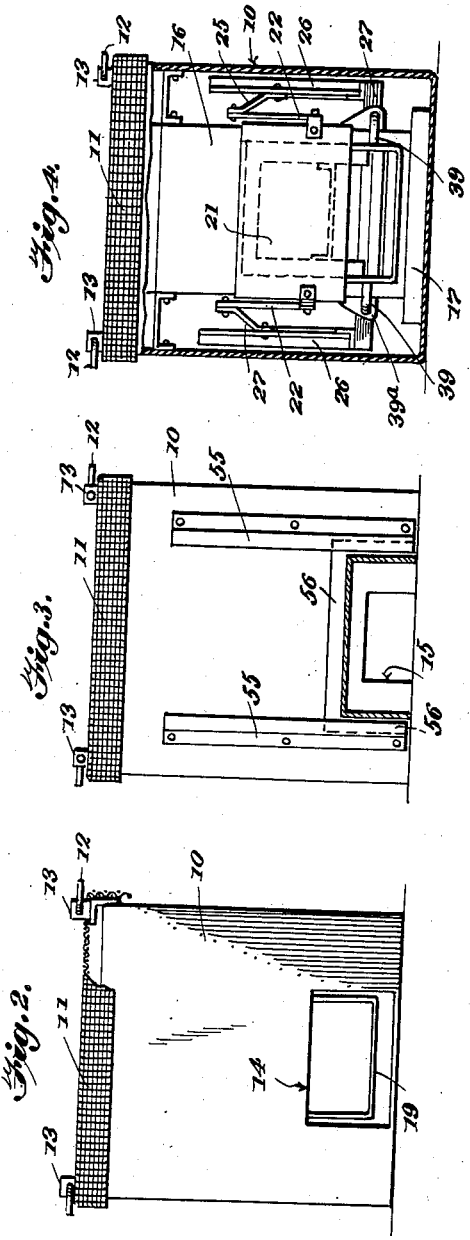
Inventor
ROBERT C. BURNLEY

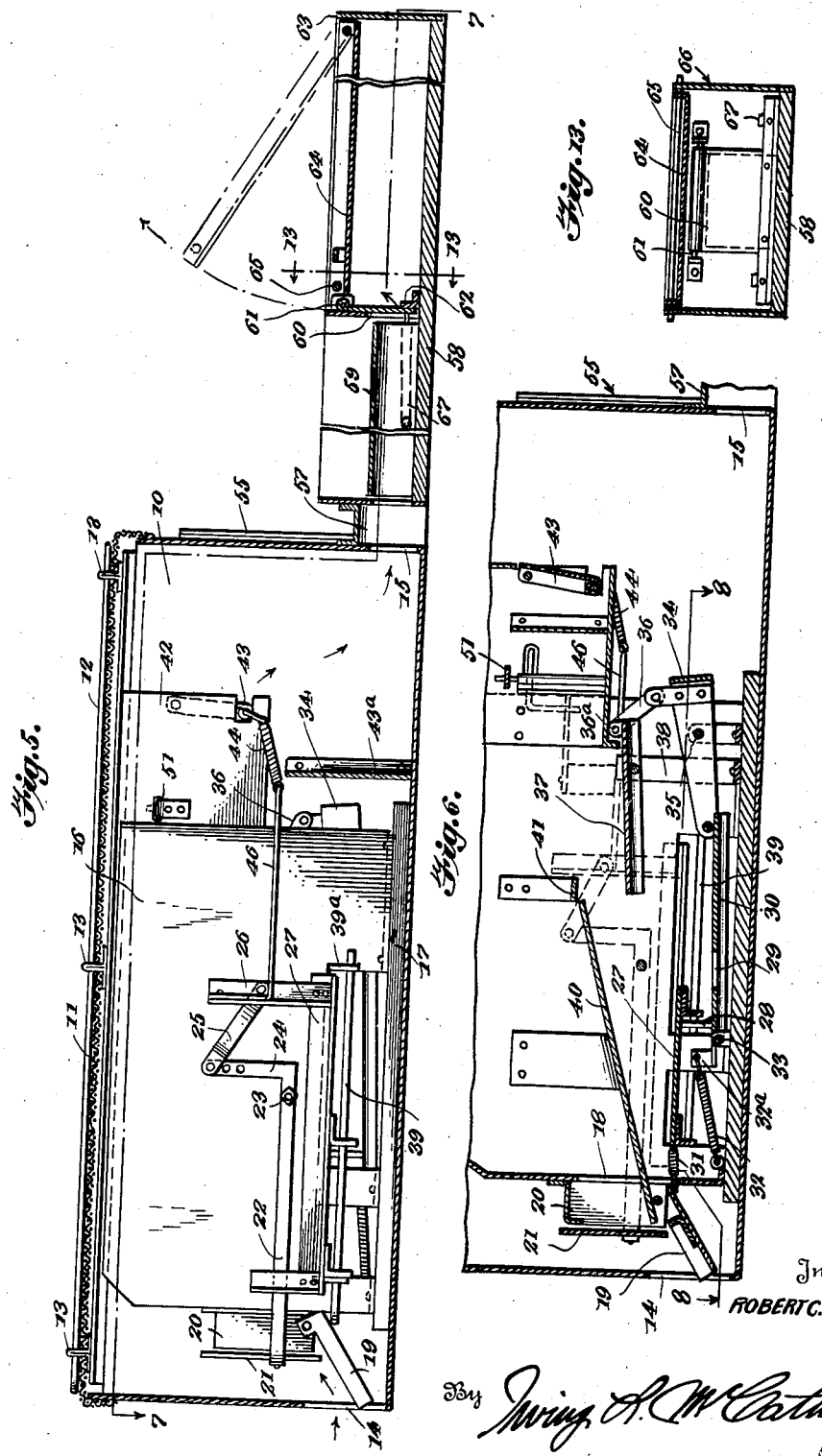

June 25, 1940.   R. C. BURNLEY   2,205,970
ANIMAL TRAP
Filed Feb. 11, 1939   4 Sheets-Sheet 3
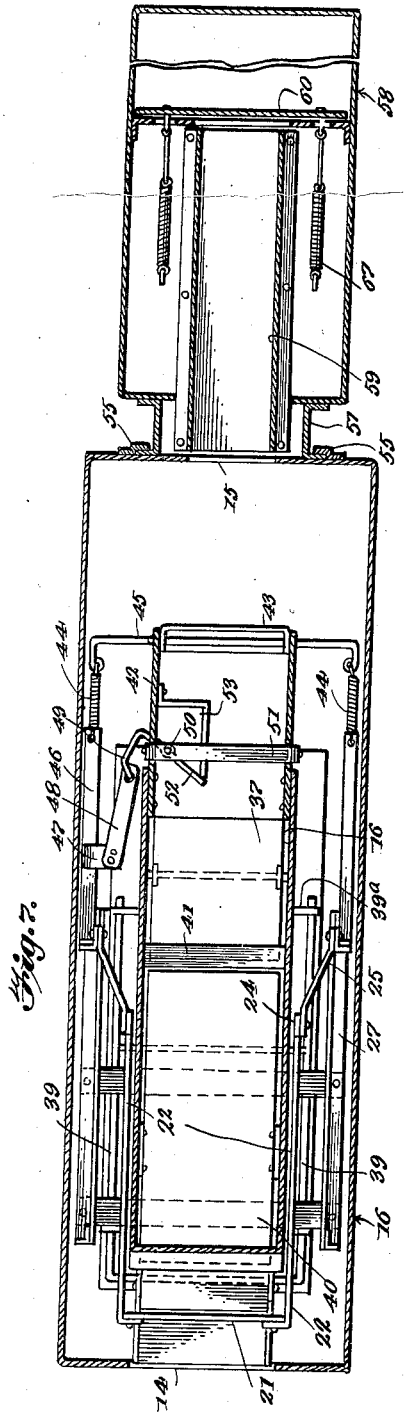
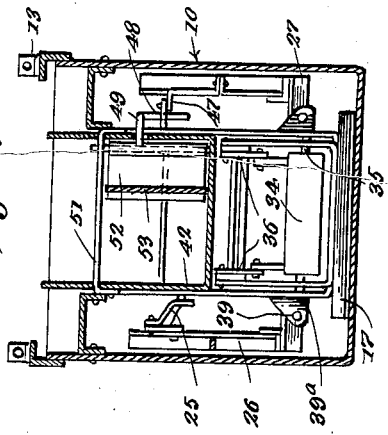
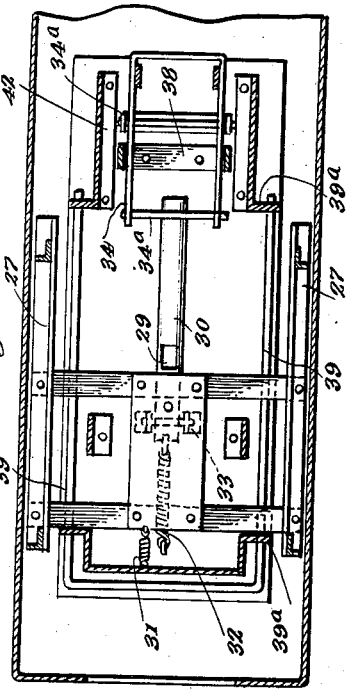
Inventor
ROBERT C. BURNLEY
By *Irving A. McCathran*
Attorney June 25, 1940.  R. C. BURNLEY  2,205,970
ANIMAL TRAP
Filed Feb. 11, 1939  4 Sheets-Sheet 4
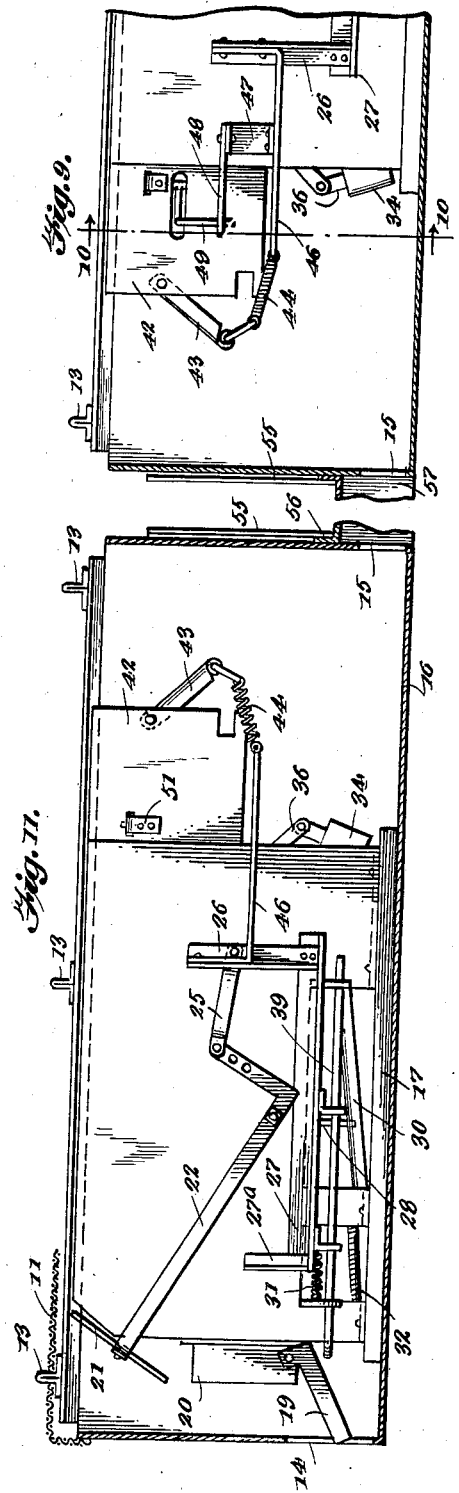
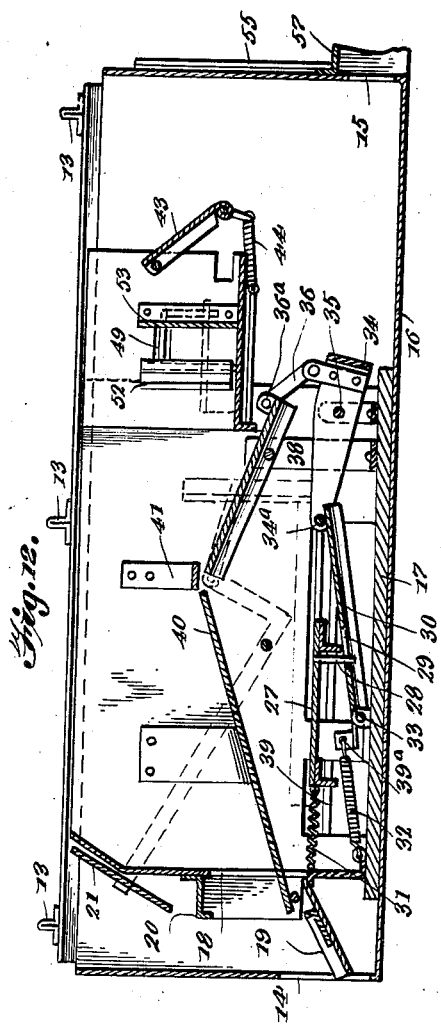
Inventor
ROBERT C. BURNLEY
Attorney Patented June 25, 1940

2,205,970

UNITED STATES PATENT OFFICE 2,205,970

ANIMAL TRAP

Robert C. Burnley, Louisville, Ky.

Application February 11, 1939, Serial No. 255,967

7 Claims. (Cl. 43—76)

This invention relates to animal traps, and has for one of its objects the production of a simple and efficient means for automatically setting the trap as an animal passes a predetermined point within the trap.

A further object of this invention is the production of a simple and efficient means for automatically closing the bait box as an animal approaches the bait box, and at the same time automatically re-setting the trap.

Another object of this invention is the production of a detachable safety container which may be easily attached to or detached from the main body of the trap.

Other objects and advantages of the present invention will appear throughout the following specification and claims.

In the drawings:

Figure 1 is a top plan view of the trap, certain parts being broken away;

Figure 2 is a front elevational view of the trap, a portion of the covering screen being shown in section;

Figure 3 is a vertical sectional view taken on line 3—3 of Figure 1;

Figure 4 is a vertical sectional view taken on line 4—4 of Figure 1;

Figure 5 is a longitudinal sectional view taken on line 5—5 of Figure 1;

Figure 6 is an enlarged longitudinal sectional view through the body of the trap, with the parts shown in a closed position;

Figure 7 is a horizontal sectional view taken on line 7—7 of Figure 5;

Figure 8 is a horizontal sectional view taken on line 8—8 of Figure 6;

Figure 9 is a fragmentary longitudinal sectional view showing the housing in section and a portion of the trap mechanism in side elevation;

Figure 10 is a vertical sectional view taken on line 10—10 of Figure 9;

Figure 11 is a longitudinal sectional view through the outer casing of the trap, the body of the trap and operating mechanism being shown in elevation;

Figure 12 is a longitudinal sectional view through the body of the trap, the parts being in an open position;

Figure 13 is a vertical sectional view taken on line 13—13 of Figure 5.

By referring to the drawings, it will be seen that 10 designates the outer casing of the trap, which casing is preferably rectangular in shape and carries a wire mesh top cover 11. This cover 11 is held in place by means of the longitudinally extending rods 12 which pass through the upstanding eyelets 13 carried by the sides of the casing 10. These eyelets 13 extend through suitable apertures formed in the cover 11 and the rods 12 lie upon the top face of the cover 11, as shown. The casing 10 is provided with a front entrance opening 14 and a rear exit opening 15.

A trap housing 16 which supports the trap mechanism is mounted within the casing 10 and is supported by a base 17. The housing 16 is provided with an entrance opening 18 and a runway 19 leads from the opening 14 to the opening 18. A shield 20 is formed around the opening 18 and the opening 18 is adapted to be closed by means of a vertically movable gate 21. This gate 21 is carried by rearwardly extending arms 22 pivoted as at 23 to the sides of the housing 16. Each arm 22 is provided with an upwardly extending end 24. The ends 24 are connected to links 25, which links 26 are pivotally connected to the upstanding arms 26 of a slidable trigger frame 27. This frame 27 carries a depending trigger rod 28 which is adapted to fit in the aperture 29 in the trigger release bar 30. A coil spring 31 engages the trigger frame 27 and exerts a forward pulling action thereon. A coil spring 32 engages the trigger release bar 30, as at 32a, to normally urge the bar 27 in an upward swinging movement upon its pivot 33. A yoke 34 is pivotally supported, as at 35, and carries a transverse rod 34a which overhangs the outer end of the bar 30, as shown in Figures 6 and 12. A link 36 is pivotally connected to the yoke 34 and the link 36 is pivoted to the ears 36a of the treadle plate 37. The plate 37 is pivotally supported upon standards 38. As shown, the trigger frame 27 is slidably mounted upon the track rods 39 which are carried upon the sides of the housing 16 and are supported by the laterally extending ears 39a. An inclined runway 40 extends from the inner end of the runway 19 adjacent the entrance opening 18, upwardly to the forward end of the treadle plate 37. A bridge plate 41 extends transversely over the adjoining ends of the runway 40 and plate 37. The frame 27 is provided with vertically extending guard arms 27a tending to keep the arms 22 against lateral displacement.

An exit extension 42 is located just above the rear end of the treadle plate 37, and an upwardly and outwardly swinging gate 43 normally closes the exit end of the extension 42. A partition 43a is carried within the casing 10 and extends upwardly to a point in close proximity to the bottom of the extension 42, as shown in Figure 5. Coil springs 44 are connected to a rod 45 carried by the lower end of the gate 43 and these springs 44 are connected to the uprights 26 of the frame 27 by means of rods 46.

As shown in Figure 7, one of the bars 46 carries a bracket arm 47. This bracket arm 47 carries a projecting arm 48 to which arm 48 is pivotally connected a crank arm 49 journaled as at 50 upon a suitable supporting strap 51. The crank arm 49 engages a gate 52 which is also journaled, as at 50, and this gate 52 is adapted to close the open front face of a bait box 53. As the frame 27 is shifted rearwardly away from the front entrance opening the closure gate 21 will be raised, and the door 52 will be opened. This frame 27 may be shifted as the animal swings the gate 43 outwardly away from the exit extension 42. The parts will then be locked in an open position. When another animal enters and trips the treadle plate 37, the trigger release bar 30 will be forced downwardly releasing the trigger rod 28 from the aperture 29, the spring 31 will automatically pull the trigger frame 27 forwardly, and in this way automatically close the gates 21, 43 and 52. Then as the second animal endeavors to extract himself from the housing 16, he finds that the natural exit will be through the gate 43 which he may push open by pushing against the bottom of the gate 43 and swinging the same in the direction of the arrows shown in Figure 5, thereby automatically resetting the parts. It should be understood that the gate 43 may be of any suitable or desired size and the entire apparatus may be proportioned to suit the purpose for which the same is constructed, depending upon the nature and kind of animals to be trapped.

It should be noted that the top cover 11 may be made of wire mesh or any other suitable material.

Vertically extending spaced trackways 55 are arranged upon the rear face of the casing 10 for slidably receiving the flanges 56 of the connecting tunnel 57 of the detachable safety container 58 into which the animal eventually passes. This container 58 is provided with a runway 59 at one end of which is a hinged gate 60 hinged at its upper end, as at 61, and which gate is adapted to swing in the direction of the arrow shown in Figure 5. A reinforcing angle flange 62 is carried by the lower edge of the gate 60. The outer end of the container 58 is preferably closed, as at 63, and a hinged cover 64 is secured to the top of the container 58 and is normally held in a closed position by means of a locking rod 65 which passes over the top of the cover 64 and through the sides 66 of the container 58. Suitable coil springs 67 are secured to the gate 60 to normally hold the gate 60 in a closed position.

From the foregoing description it will be seen that a very efficient animal trap is provided, which after once having been set, will be automatically reset as the trapped animal passes a predetermined point and endeavors to escape through the exit extension 42 by swinging the plate 43 outwardly.

It should be understood that certain detail changes in the mechanical construction, combination and arrangement of parts may be employed without departing from the spirit of the invention so long as such changes fall within the scope of the appended claims.

Having described the invention, what is claimed as new is:

1. A trap of the class described comprising a housing having an entrance opening and an exit opening, a treadle member mounted in said housing, a closure gate for said entrance opening, means actuated by the treadle member for closing said gate, a closure gate for said exit opening, means operable by said last mentioned gate for automatically closing the first mentioned gate as said last mentioned gate is opened, a bait box carried within the housing, a closure gate for the bait box, and means operable in unison with said first mentioned gate for automatically closing the gate of the bait box as said first mentioned gate is closed.

2. A trap of the class described comprising a housing having an entrance opening and an exit opening, a treadle member mounted in said housing, a closure gate for said entrance opening, means actuated by the treadle member for closing said gate, a closure gate for said exit opening, a trigger frame slidably mounted upon said housing, a trigger release bar pivotally mounted below said frame, means carried by the trigger frame for engaging the release bar for holding the frame in a set position, means for automatically moving the frame longitudinally when the frame is released, and means operable from said frame for automatically swinging said first mentioned gate to a closed position.

3. A trap of the class described comprising a housing having an entrance opening and an exit opening, a treadle member mounted in said housing, a closure gate for said entrance opening, means actuated by the treadle member for closing said gate, a closure gate for said exit opening, a trigger frame slidably mounted upon said housing, a trigger release bar pivotally mounted below said frame, means carried by the trigger frame for engaging the release bar for holding the frame in a set position, means for automatically moving the frame longitudinally when the frame is released, gate supporting arms pivotally mounted upon said housing, and link means connecting said arms with said frame for automatically moving said first mentioned gate to a closed position as said trigger frame is moved longitudinally of said housing.

4. A trap of the class described comprising a housing having an entrance opening and an exit opening, a treadle member mounted in said housing, a closure gate for said entrance opening, means actuated by the treadle member for closing said gate, a closure gate for said exit opening, a trigger frame slidably mounted upon said housing, a trigger release bar pivotally mounted below said frame, means carried by the trigger frame for engaging the release bar for holding the frame in a set position, means for automatically moving the frame longitudinally when the frame is released, gate supporting arms pivotally mounted upon said housing, link means connecting said arms with said frame for automatically moving said first mentioned gate to a closed position as said trigger frame is moved longitudinally of said housing, and longitudinally extending track rods for supporting said trigger frame.

5. A trap of the class described comprising a housing having an entrance opening and an exit opening, a treadle plate mounted in said housing, a closure gate for said entrance opening, means actuated by the treadle plate for closing said gate, a closure gate for said exit opening, a trigger frame slidably mounted upon said housing, a trigger release bar pivotally mounted below said frame, means carried by the trigger frame for engaging the release bar for holding the frame in a set position, means for automatically moving the frame longitudinally when the frame is released, gate supporting arms pivotally mounted upon said housing, link means connecting said arms with said frame for automatically moving said first mentioned gate to a closed position as said trigger frame is moved longitudinally of said housing, longitudinally extending track rods for supporting said trigger frame, link means connecting said trigger release bar with said treadle plate for moving said trigger release bar to a releasing position, spring means for normally holding the trigger release bar in a set position, and a runway leading from the entrance opening to a point adjacent the forward end of said treadle plate.

6. A trap of the class described comprising a housing having an entrance opening and an exit opening, a treadle plate mounted in said housing, a closure gate for said entrance opening, means actuated by a treadle plate for closing said gate, a closure gate for said exit opening, a trigger frame slidably mounted upon said housing, a trigger release bar pivotally mounted below said frame, means carried by the trigger frame for engaging the release bar for holding the frame in a set position, means for automatically moving the frame longitudinally when the frame is released, means operable from said frame for automatically swinging said first mentioned gate to a closed position, and yieldable connecting means connecting the last mentioned gate with said frame for moving said frame to a set position as said last mentioned gate is moved to an open position.

7. A trap of the class described comprising a housing, a trigger frame slidably mounted upon the housing, said housing having an entrance opening and an exit opening, a treadle plate pivoted within the housing, trip means actuated by the treadle plate for engaging the trigger frame and holding the same in a set position the trip means being adapted to be released when the treadle plate is actuated, a closure gate for the entrance opening, means actuated by the trigger frame for automatically closing said gate when the trigger frame is released, a bait box in said housing, a gate for said bait box, crank means connected to the trigger frame for automatically closing the gate of the bait box when the gate for the entrance opening is closed, a gate for the exit opening, and means connecting the last mentioned gate with said trigger frame whereby said trigger frame may be moved to a locked position when said last mentioned gate is opened and said first mentioned gate will be moved to an open position.

ROBERT C. BURNLEY.